(No Model.) 2 Sheets—Sheet 1.
W. HOLT.
ROD SUPPORTER FOR STOP COCKS.
No. 551,729. Patented Dec. 17, 1895.
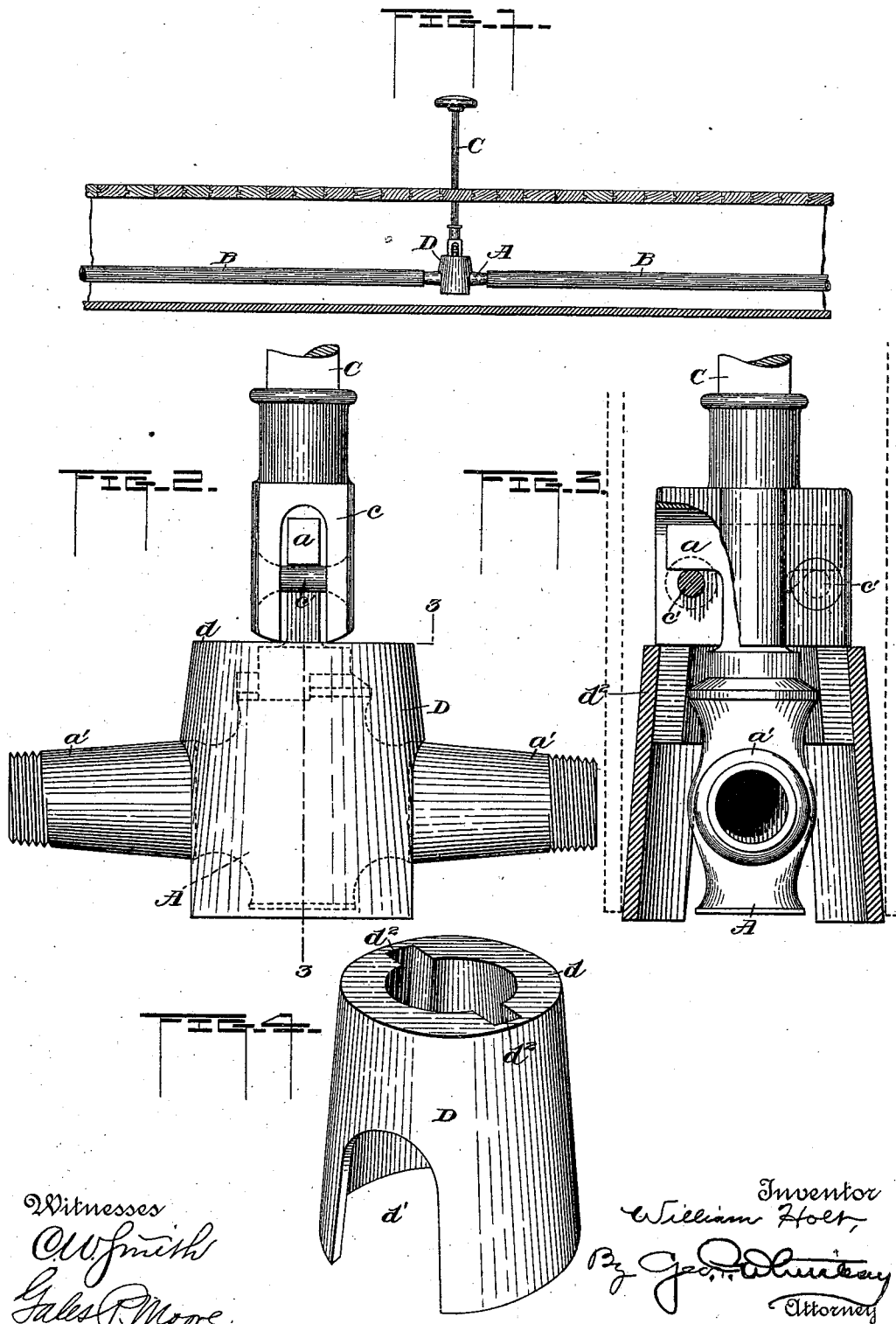
Witnesses
C. W. Smith
Gales P. Moore
Inventor
William Holt,
By Geo. Whitney
Attorney (No Model.) 2 Sheets—Sheet 2.
W. HOLT.
ROD SUPPORTER FOR STOP COCKS.
No. 551,729. Patented Dec. 17, 1895.
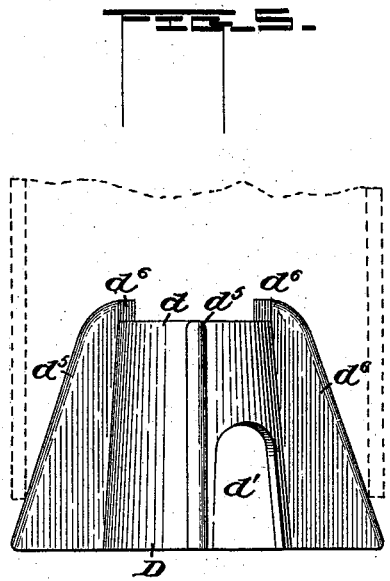
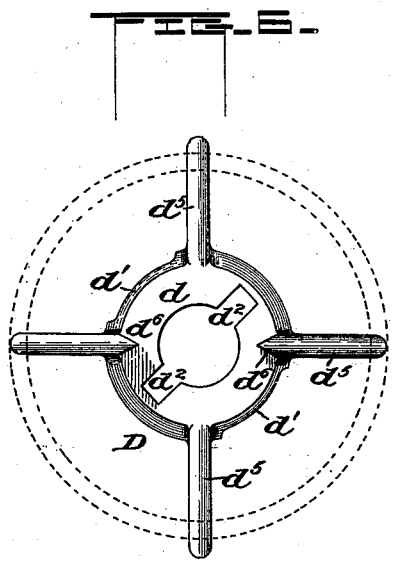
Witnesses
O. W. Smith
A. W. Long
Inventor
William Holt,
By Jed. D. Whitney
Attorney

UNITED STATES PATENT OFFICE.

WILLIAM HOLT, OF CHICAGO, ILLINOIS.

ROD-SUPPORTER FOR STOP-COCKS.

SPECIFICATION forming part of Letters Patent No. 551,729, dated December 17, 1895.

Application filed January 9, 1895. Serial No. 534,282. (No model.)

*To all whom it may concern:*

Be it known that I, WILLIAM HOLT, a citizen of the United States, residing at Chicago, in the county of Cook and State of Illinois, have invented certain new and useful Improvements in Rod-Supporters for Stop-Cocks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to water-distribution, and its object is to prevent the turning-plugs in valves or stop-cocks from wearing or getting stuck in their sockets.

Stop-cocks, valves, and waste-cocks for water-supply pipes are often placed under a floor or in a well or casing, with the key rod or wrench for turning them placed upon the plug of the cock. If the weight of the rod is allowed to rest upon the key of the cock, the taper turning-plug is often forced so tightly into its socket that the plug is subjected to great wear and frequently becomes wedged or stuck, so that it is difficult or sometimes impossible to turn it. To obviate this difficulty it is customary to support the rod by drilling a hole through it and putting in a cross-pin whose projecting ends rest upon a bracket fastened to an adjacent wall, or, when the rod passes through a floor, the pin rests upon a washer placed upon the floor; but these methods of support often fail because of the settling of walls and floors, which throws the weight of the rod upon the plug of the cock or valve.

My invention provides a simple and effective device for supporting the rod, which is not affected by the settlement of floors or walls and which saves a good deal of the workman's time when putting in supply-pipes, cocks, and valves. The invention consists in a supporting-shell adapted to rest on the body of the cock or on the pipe adjacent thereto and having a preferably flat top surrounding the plug of the cock, on which top the lower end of the key rod or wrench rests and turns. The weight of the rod is thus supported by the body of the cock or by the pipe, instead of by the plug of the cock or the stem of the valve.

In the drawings, Figure 1 shows a section of a floor with a water-pipe below it provided with a stop-cock equipped with my rod-supporter. Fig. 2 is an enlarged side view, and Fig. 3 a sectional end view on line 3 3 of the cock-supporter and the socket of the rod. Fig. 4 is a perspective view of the supporter. Figs. 5 and 6 are respectively elevation and plan views of a modification of the supporter shown in Fig. 4.

The valve or cock A may be of any of the various styles of stop, check or waste cocks made by different manufacturers, and the pipe B may be for supplying water, gas, steam or any other fluid. I have shown in Sheet 1 an ordinary stop and waste cock for water-supply pipes. The taper turning-plug of this cock has a T-shaped key $a$. The rod or wrench C has a forked lower end or socket $c$ to fit down over the key $a$, where it may be loosely retained by pins or rivets $c'$, passing under the arms of the key $a$. These parts are all of the usual construction.

It will be seen that, were nothing done to prevent it, the weight of the rod C would come directly upon the key $a$ of the plug. To prevent this I use a supporter D or D', which is a casting made to fit the particular style of cock with which it is to be used, and consisting essentially of a shell to rest on the body of the cock or valve and having a top $d$ to receive and support the wrench-socket $c$.

In the form shown in Figs. 4 and 5 the supporter is a frusto-conical shell open at the bottom and having a preferably flat top $d$, though the top may be curved or made in any other suitable shape. In the lower sides of the supporter D are two diametrically-opposite slots $d'$ to enable it to be dropped down over the stop-cock, the slots receiving the projecting nipples $a'$ of the stop-cock. The top $d$ is preferably annular, leaving a central opening to admit the upper end of the valve-body and the stem of the plug. In opposite sides of the top are cut vertical grooves $d^2$ to permit the supporter to be passed down over and below the arms of the key $a$. The bottom of the shell and the bottom of the valve-body are preferably on the same level, so that both may rest on a block or on the floor when desired.

When placed in position the top of the supporter stands concentric with and perpendicular to the axis of the plug of the cock. The lower end of the wrench-socket $c$ rests upon the top $d$, and slides around easily thereon in turning. The weight of the wrench is thus carried by the valve-body instead of by the plug or stem.

The nipples $a'$ are shown integral with the valve-body, but in some styles of valve the parts marked $a'$ in the drawings would represent the ends of the supply-pipe extending from the valve-casing, in which case the supporter D would be sustained by the pipe instead of by the valve-body.

When stop-cocks are located under the ground, trouble often occurs by reason of the box or casing through which the wrench is inserted getting shifted so as to be out of line with the stop-cock. By making the base of the box to fit the base of the supporter D, as shown in dotted lines in Fig. 3, all such difficulty is removed. Should it be desired to use a larger casing, the supporter shown in Figs. 5 and 6 can be used, in which the radial sloping wings $d^5$, formed integral with or attached to the supporter D, serve to properly center the casing. (Shown in dotted lines.) Two opposite wings are preferably extended up above the top $d$, forming stops $d^6$ which positively limit the range of movement of the socket $c$, and prevent it from either shearing off the check-pin in the plug of the valve, or from turning the plug too far when no check-pin is used.

Having thus described my invention, what I claim is—

1. A supporter for stop cock or valve wrenches, consisting of a shell open at the lower end, and having slots in its sides, and a top adapted to stand below the key of the cock and suitably formed to receive and support the wrench, substantially as described.

2. A supporter for stop cock or valve wrenches, consisting of a shell having slots in its lower sides, an annular top, adapted to stand below the key of the cock, and vertical grooves in opposite sides of said top, substantially as described.

3. The combination with an ordinary stop cock, of a supporter for the key-wrench consisting of a small shell having slots in its sides so that it is adapted to slip down around and rest upon the body of the stop cock inside of and separate from the box or casing, said shell having a top adapted to stand below the key of the cock when the shell is in place, and suitably formed to receive and support the wrench when it is inserted into the casing, substantially as described.

4. The combination with a stop cock having a key provided with horizontal arms, of a key wrench supporter consisting of a small shell adapted to be dropped down upon the body of the stop cock, said shell having internal grooves to pass down over the arms of the key, and a top concentric with the plug of the stop cock and below said arms, to afford a support for the key wrench, when the latter is engaged with said arms, substantially as described.

5. A supporter for stop cock or valve wrenches, consisting of a shell open at the lower end and having opposite slots in its sides to receive the pipe, a top adapted to stand below the key of the cock when the shell is in place, and suitably formed to receive and support the wrench, and radial wings sloping downward and outward on the outside of said shell, substantially as described.

6. A supporter for stop cock or valve wrenches, consisting of a shell open at the lower end and having opposite slots in its sides to fit the pipe, a top suitably formed to receive and support the wrench, and radial wings sloping downward and outward on the outside of said shell, two oppositely disposed wings being extended up above the top of the shell to form stops for the key wrench, substantially as described.

In testimony whereof I affix my signature in presence of two witnesses.

WILLIAM HOLT.

Witnesses:
M. LOEB,
ALBERT FITHELL.